Jan. 21, 1947.  L. GELBMAN  2,414,734
LIGHTWEIGHT CONCRETE AGGREGATE
Filed Sept. 4, 1943

INVENTOR.
LOUIS GELBMAN
BY
ATTORNEY.

Patented Jan. 21, 1947

2,414,734

UNITED STATES PATENT OFFICE 2,414,734

LIGHTWEIGHT CONCRETE AGGREGATE

Louis Gelbman, Yonkers, N. Y.

Application September 4, 1943, Serial No. 501,337

4 Claims. (Cl. 106—41)

This invention relates to a process for forming a lightweight concrete aggregate, and has particular reference to the formation of a lightweight concrete aggregate from the residue of pulverized coal furnaces. This residue consists chiefly of fly ash and slag.

The use of pulverized coal in furnaces of power plants and other purposes is on the increase. The residue, after combustion, consists essentially of fly ash, which would fly up and out of the chimney, but in practice is caught and collected by an electrical apparatus, and slag which is originally a molten substance and drips or runs down out of the grate. The general practice is to catch this molten substance in water where it instantly hardens and then resembles small glass pebbles or marbles, glass strands, and other glass formations.

At the present time it costs money to dispose of the residue described above. If the furnaces are near the sea it is usually taken out and dumped. Other plants are forced to cart this material to dumping grounds. This invention proposes a process for converting the residue mentioned above into a lightweight aggregate which may then be used as an aggregate for lightweight concrete. The invention proposes to use a sintering process for obtaining said aggregate.

I have experimented with the residue referred to and have found that the fly ash is rich in combustibles, 7 to 20% being present, but that it is very difficult to ignite same effectively because it is hard to supply a sufficient amount of air to support combustion. The trouble seems to be that fly ash has a tendency to pack tight, and even though a strong draft is used, sufficient air cannot pass through this material. But I have succeeded in overcoming this obstacle, as will be presently explained. The slag has little if any combustible material, but this substance is good as a filler constituent in the aggregate.

I have found that said last mentioned obstacle may be overcome by adding a lightweight fine porous inert material, preferably obtained from a previous sintering of fly ash, or fly ash and slag, which I shall hereinafter call reutrn fine sinter, to a new batch of fly ash, or a mixture of fly ash and slag. A draft may easily pass through a charge thus prepared, which is therefore easily ignitable. I have found that when ignited the mixture makes good lightweight concrete aggregate.

The sintering process for forming lightweight concrete aggregate, used in accordance with this invention, consists essentially in placing a mixture of return fine sinter and fly ash, or return fine sinter, fly ash and slag in a furnace, forcing a strong air draft through the furnace and igniting the mixture with a torch. The mixture burns for a short period of time, and is then dumped. It will be found that the ignited and burned mixture is now in the form of a sinter cake, though there is still a large percentage of loose and fine particles which were not amalgamated with the main cake. The sinter cake is then coarse crushed, which breaks it up into a plurality of small pieces and which frees an additional large amount of particles which were not tightly amalgamated, because of only partial sintering. These loose particles form the return fine sinter previously referred to. They will amount to about 30 to 40% of the entire charge used. However, when these return fine sinters are used in a subsequent batch and the sintering process is repeated, they will sinter into a cake product of satisfactory lightness and strength.

The approximate formula of the fly ash used in my experiments is as follows:

| | | |
|---|---|---|
| $SiO_2$ | percent | 50–55 |
| $Al_2O_3$ | do | 23–30 |
| $Fe_2O_3$ | do | 13 |
| CaO | do | 3–5 |
| MgO | do | 2–3 |
| Carbon | do | 7 to 20 |
| Loss on igniting | do | 7 to 20 |
| Weight | lbs./cu. ft. | 50 |

The approximate formula for the slag which I have used is as follows:

| | |
|---|---|
| $SiO_2$ | 43.22 |
| $Fe_2O_3$ | 25.78 |
| $Al_2O_3$ | 28.10 |
| CaO | 1.73 |
| MgO | 0.43 |
| $SO_3$ | 0.24 |
| Weight lbs./cu. ft. | 80 |

My experiments have shown a satisfactory mixture to be in the following proportions: ¾ cu. ft. return fine sinter, 1¼ cu. ft. fly ash; ½ cu. ft. slag. For this amount of substance I have used the draft of an approximately 15" blower fan driven by a 10 H. P. motor and capable of producing suction of 55" of water. I have used a fuel oil torch for igniting the mixture.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
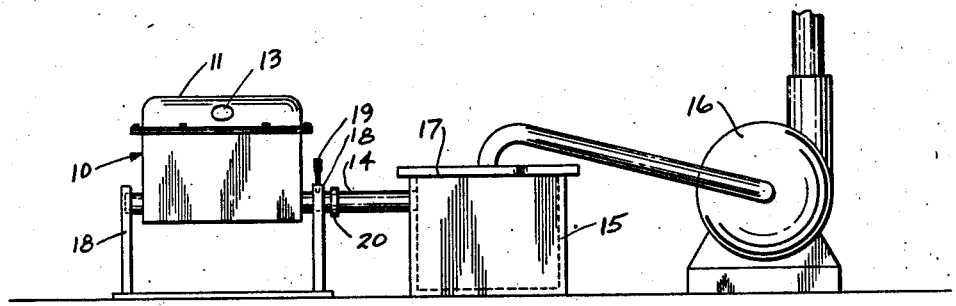
Fig. 1 is a side elevational view of apparatus which may be used in carrying out my process.
Figure 2:
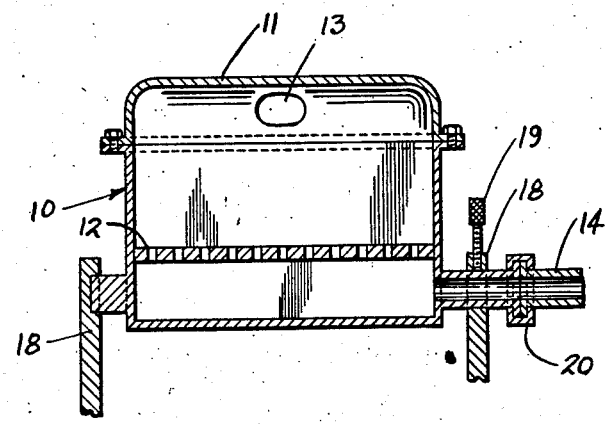
Fig. 2 is a fragmentary sectional view through the furnace portion of the apparatus shown in Fig. 1.

The apparatus used in carrying out my invention essentially consists of a furnace 10 in the nature of a closed vessel having a removable top cover 11, and a grate 12 spaced slightly from the bottom of the vessel. The cover 11 is formed with an opening or openings 13 through which the flame from a torch may pass to ignite the charge within the furnace. An air pipe 14 connects with the bottom portion of the vessel 10 at a point beneath the grate 12. This pipe 14 is connected with a filter chamber 15 which in turn is connected with a motor driven blower 16. The purpose of the filter chamber 15 is merely to protect the blower so that heavy particles which are liable to damage the blower will fall to the bottom of the filter compartment.

The filter chamber 15 is merely a vessel of a relatively large interior compass having a removable cover 17. Because of the large interior compass the speed of the air passing through the chamber will be slower than the speed of the air passing through the pipe 14. For this reason relatively large particles will drop and remain at the bottom of the chamber 15.

The furnace 10 is swivelly mounted on standards 18 to facilitate dumping. A clamp screw 19 is shown mounted upon one of the standards for holding the furnace 10 upright when desired. The pipe 14 includes a swivel connection 20 which permits dumping of the furnace 10 without twisting the remaining portion of the pipe 14.

The operation of the device is as follows:

The cover 11 is removed and the furnace 10 is filled with a mixture of return fine sinter, fly ash, and slag substantially in the proportions stated above. The cover 11 is then replaced. The blower 16 is set into operation and draws air through the opening or openings 13 and through the material on the grate 12. The charge within the furnace is then ignited by a flame from a torch through the opening or openings 13. It will ignite and burn for a short period of time. It is then dumped in cake form. It will next be crushed into a lightweight aggregate form which makes a fine aggregate for lightweight concrete.

Approximately 30% to 40% of the charge from one sintering operation will form small particles which may be sieved and used as return fine sinters for a subsequent charge. These return fine sinters are mixed with fly ash, as previously explained. A feature of the present process resides in the fact that the said return fine sinter left over from a previous sintering charge is used in the next sinter charge to make the fly ash sufficiently porous so that a good draft may go through the charge. With this arrangement the process of forming the lightweight concrete aggregate is continuous. The very first charge may be made porous by some foreign ingredient, such as cinders, ash, or other lightweight porous material.

Another important feature of this invention resides in the fact that the new lightweight concrete aggregate will be exceptionally uniform in structure. The physical properties of sample after sample will be substantially the same. The reason for this resides in the fact that the fly ash obtained in furnaces burning pulverized coal is exceptionally uniform. This markedly distinguishes from prior processes in which lightweight concrete aggregate was produced from materials varying greatly in physical and chemical characteristics. Consequently, the aggregates themselves varied greatly.

The new aggregate is also free of any contaminating ingredients which might have deleterious effects on concrete. In the new aggregate, the iron is in the form of silicates, and the sulphur has been eliminated as a result of the sintering. The carbon from the fly ash has been burned out, which is important, since it forms a poor admixture in cement.

The terms "sintering" and "sinter," as used herein, have substantially the same meaning that they have in the metallurgical art: to wit, "sintering" is the process of treating materials by subjecting a charge of finely crushed material containing a combustible to the heat generated by the internal combustion of said combustible supported by a blast of air passing through the charge. Ignition is effected by the momentary action of a flame at one surface of the charge, the combustion being carried on through the charge under the influence of the air blast. A "sinter" is the hard, cellular or porous product of comparative light weight produced by this sintering action.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A process for forming a lightweight concrete aggregate from the residue of a furnace burning pulverized coal, consisting in sintering a mixture of return fine sinter, fly ash and slag, in the proportions of ¾ of a cu. ft. of return fine sinter, 1¼ cu. ft. of fly ash, and ½ cu. ft. of slag.

2. A process for forming a lightweight aggregate from the residue of a furnace burning pulverized coal consisting in placing a mixture of return fine sinter, fly ash and slag in a furnace, forcing a strong air draft through said furnace, and igniting said mixture with a torch, the mixture of said ingredients being used substantially in the proportions of ¾ cu. ft. of return fine sinter, 1¼ cu. ft. of fly ash, ½ cu. ft. of slag.

3. In a process for forming a lightweight concrete aggregate, the steps of sintering a mixture of fly ash and slag as obtained from a furnace burning pulverized coal and sinter.

4. In a process for forming a lightweight concrete aggregate, the steps of sintering a mixture of fly ash and slag as obtained from a furnace burning pulverized coal and return fine sinter as obtained from sintering a prior batch of these same ingredients.

LOUIS GELBMAN.